(12) United States Patent
Kapoor et al.

(10) Patent No.: US 8,050,288 B2
(45) Date of Patent: *Nov. 1, 2011

(54) METHOD AND APPARATUS FOR INTERFERENCE SUPPRESSION IN ORTHOGONAL FREQUENCY DIVISION MULTIPLEXED (OFDM) WIRELESS COMMUNICATION SYSTEMS

(75) Inventors: Samir Kapoor, Voorhees, NJ (US); Daniel J. Marchok, Buchanan, MI (US)

(73) Assignee: Tellabs Operations, Inc., Naperville, IL (US)

( * ) Notice: Subject to any disclaimer, the term of this patent is extended or adjusted under 35 U.S.C. 154(b) by 2385 days.

This patent is subject to a terminal disclaimer.

(21) Appl. No.: 09/975,518

(22) Filed: Oct. 11, 2001

(65) Prior Publication Data

US 2002/0105928 A1   Aug. 8, 2002

(51) Int. Cl.
 *H04J 3/16* (2006.01)
(52) U.S. Cl. ......... 370/465; 370/252; 370/330; 370/343
(58) Field of Classification Search .................. None
 See application file for complete search history.

(56) References Cited

U.S. PATENT DOCUMENTS

| | | | |
|---|---|---|---|
| 3,978,482 A | 8/1976 | Williams et al. | 343/11 R |
| 4,535,472 A | 8/1985 | Tomcik | |
| 4,630,305 A | 12/1986 | Borth et al. | |
| 4,817,141 A | 3/1989 | Taguchi | |
| 4,931,803 A | 6/1990 | Shimko | 342/371 |
| 4,956,835 A | 9/1990 | Grover | |
| 5,103,459 A | 4/1992 | Gilhousen et al. | |
| 5,192,957 A | 3/1993 | Kennedy | |
| 5,206,886 A | 4/1993 | Bingham | |

(Continued)

FOREIGN PATENT DOCUMENTS

| | | |
|---|---|---|
| WO | WO 87/00366 A1 | 1/1987 |
| WO | WO 00/41169 A1 | 7/2000 |
| WO | WO 01/73760 A1 | 10/2001 |

OTHER PUBLICATIONS

Bingham, "Multicarrier Modulation for Data Transmission: An Idea Whose Time Has Come," *IEEE Communications Magazine*, pp. 5-14 (May 1990).

Cimini, "Analysis and Simulation of a Digital Mobile Channel Using Orthogonal Frequency Division Multiplexing," *IEEE Transactions on Communication*, pp. 665-675 (Jul. 1985).

(Continued)

*Primary Examiner* — Robert Wilson
(74) *Attorney, Agent, or Firm* — Hamilton, Brook, Smith & Reynolds, P.C.

(57) ABSTRACT

A method and apparatus for interference suppression in wireless communication systems, especially Orthogonal Frequency Division Multiplexed (OFDM) systems. The array apparatus includes a two-tier adaptive array system which provides for both spatial diversity and beamforming at the uplink. The adaptive array is comprised of sub-arrays spaced at a distance sufficient to provide spatial diversity, ideally 5 to 15 wavelengths at the frequency of operation. Each sub-array is composed of at least two antenna elements spaced in proximity sufficient to provide effective beamforming or scanning, ideally less then one-half of one wavelength at the frequency of operation. The Direction of Arrival (DOA) of signals impinging upon the array can be calculated by comparing signals from sub-array elements. Each sub-array can then be filtered or beamformed so as to provide high gain to desired signals received from the DOA (which may be a multipath signal) while at the same time damping out undesired signals such as co-channel interference (CCI) in the frequency band of operation. The DOA is also used in a method of allocating frequency bins for data signals, such as in an OFDMA system, to provide weighted guidelines for bin allocation to maximize received signal power.

22 Claims, 6 Drawing Sheets

U.S. PATENT DOCUMENTS

| | | | |
|---|---|---|---|
| 5,235,621 A | | 8/1993 | Amir-Alikhani |
| 5,253,270 A | | 10/1993 | Petit |
| 5,260,968 A | * | 11/1993 | Gardner et al. ............... 375/347 |
| 5,285,474 A | | 2/1994 | Chow et al. |
| 5,301,205 A | | 4/1994 | Tsutsui et al. |
| 5,345,599 A | * | 9/1994 | Paulraj et al. ................. 455/500 |
| 5,414,433 A | * | 5/1995 | Chang ........................... 342/375 |
| 5,416,767 A | | 5/1995 | Koppelaar et al. |
| 5,416,801 A | | 5/1995 | Chouly et al. |
| 5,444,697 A | | 8/1995 | Leung et al. |
| 5,461,640 A | | 10/1995 | Gatherer |
| 5,479,447 A | | 12/1995 | Chow et al. |
| 5,483,529 A | | 1/1996 | Baggen et al. |
| 5,521,908 A | | 5/1996 | Younce et al. |
| 5,566,209 A | * | 10/1996 | Forssen et al. ................. 375/262 |
| 5,583,967 A | | 12/1996 | Akagiri |
| 5,594,757 A | | 1/1997 | Rohani |
| 5,608,764 A | | 3/1997 | Sugita et al. |
| 5,610,908 A | | 3/1997 | Shelswell et al. |
| 5,627,863 A | | 5/1997 | Aslanis et al. |
| 5,636,246 A | | 6/1997 | Tzannes et al. |
| 5,636,250 A | | 6/1997 | Scarpa |
| 5,675,572 A | | 10/1997 | Hidejima et al. |
| 5,675,608 A | | 10/1997 | Kim et al. |
| 5,684,920 A | | 11/1997 | Iwakami et al. |
| 5,687,165 A | | 11/1997 | Daffara et al. |
| 5,694,389 A | | 12/1997 | Seki et al. |
| 5,726,978 A | * | 3/1998 | Frodigh et al. ................. 370/252 |
| 5,771,024 A | * | 6/1998 | Reece et al. .................... 343/725 |
| 5,784,363 A | | 7/1998 | Engstrom et al. |
| 5,790,514 A | | 8/1998 | Marchok et al. |
| 5,790,615 A | | 8/1998 | Beale et al. |
| 5,809,030 A | | 9/1998 | Mestdagh et al. |
| 5,812,523 A | | 9/1998 | Isaksson et al. |
| 5,815,488 A | | 9/1998 | Williams et al. |
| 5,841,813 A | | 11/1998 | Van Nee |
| 5,844,951 A | | 12/1998 | Proakis et al. |
| 5,864,546 A | | 1/1999 | Campanella |
| 5,870,432 A | | 2/1999 | Kerchhove |
| 5,912,920 A | | 6/1999 | Marchok et al. |
| 5,919,137 A | | 7/1999 | Finger et al. |
| 5,933,421 A | * | 8/1999 | Alamouti et al. ............. 370/330 |
| 5,949,796 A | | 9/1999 | Kumar |
| 5,983,078 A | * | 11/1999 | Bossard ........................ 455/63.3 |
| 5,995,483 A | | 11/1999 | Marchok et al. |
| 5,995,568 A | | 11/1999 | Molnar et al. |
| 6,008,760 A | * | 12/1999 | Shattil ........................... 342/378 |
| 6,009,130 A | | 12/1999 | Lurey et al. .................... 375/347 |
| 6,035,000 A | | 3/2000 | Bingham |
| 6,047,020 A | | 4/2000 | Hottinen |
| 6,055,575 A | | 4/2000 | Paulsen et al. |
| 6,061,796 A | | 5/2000 | Chen et al. |
| 6,072,782 A | | 6/2000 | Wu |
| 6,073,179 A | | 6/2000 | Liu et al. |
| 6,075,777 A | | 6/2000 | Agrawal et al. |
| 6,079,020 A | | 6/2000 | Liu |
| 6,091,932 A | | 7/2000 | Langlais |
| 6,097,763 A | | 8/2000 | Djokovic et al. |
| 6,101,230 A | | 8/2000 | Chun et al. |
| 6,104,930 A | * | 8/2000 | Ward et al. ..................... 455/450 |
| 6,108,349 A | | 8/2000 | Marchok et al. |
| 6,108,610 A | | 8/2000 | Winn |
| 6,118,758 A | | 9/2000 | Marchok et al. |
| 6,122,246 A | | 9/2000 | Marchok et al. |
| 6,122,260 A | | 9/2000 | Liu et al. |
| 6,125,150 A | | 9/2000 | Wesel et al. |
| 6,141,317 A | | 10/2000 | Marchok et al. |
| 6,141,335 A | | 10/2000 | Kuwahara et al. ............. 370/342 |
| 6,144,340 A | | 11/2000 | Kiiski et al. .................... 342/371 |
| 6,144,711 A | | 11/2000 | Raleigh et al. |
| 6,148,023 A | | 11/2000 | Pelin et al. |
| 6,212,175 B1 | | 4/2001 | Harsch .......................... 370/338 |
| 6,266,367 B1 | | 7/2001 | Strait |
| 6,279,022 B1 | | 8/2001 | Miao et al. |
| 6,285,654 B1 | | 9/2001 | Marchok et al. |
| 6,347,234 B1 | | 2/2002 | Scherzer |
| 6,347,237 B1 | * | 2/2002 | Eden et al. ..................... 505/210 |
| 6,427,134 B1 | | 7/2002 | Garner et al. |
| 6,466,557 B1 | | 10/2002 | Doi |
| 6,473,394 B1 | | 10/2002 | Marchok et al. |
| 6,487,252 B1 | | 11/2002 | Kleider et al. |
| 6,487,598 B1 | | 11/2002 | Valencia |
| 6,529,868 B1 | | 3/2003 | Chandran et al. |
| 6,654,429 B1 | | 11/2003 | Li |
| 6,690,680 B1 | | 2/2004 | Marchok et al. |
| 6,771,590 B1 | | 8/2004 | Marchok et al. |
| 6,795,424 B1 | * | 9/2004 | Kapoor et al. ................. 370/343 |
| 6,804,192 B1 | | 10/2004 | Marchok et al. |
| 6,912,194 B1 | | 6/2005 | Marchok et al. |
| 6,950,388 B2 | | 9/2005 | Marchok et al. |
| 6,999,772 B2 | | 2/2006 | Song et al. |
| 7,058,572 B1 | | 6/2006 | Nemer |
| 7,096,182 B2 | | 8/2006 | Chandran et al. |
| 7,369,990 B2 | | 5/2008 | Nemer |
| 7,424,424 B2 | | 9/2008 | Chandran et al. |
| 7,613,102 B2 | | 11/2009 | Marchok et al. |
| 7,616,553 B2 | | 11/2009 | Marchok et al. |
| 2003/0040908 A1 | | 2/2003 | Yang et al. |
| 2003/0193917 A1 | * | 10/2003 | Song et al. ..................... 370/335 |
| 2003/0196087 A1 | | 10/2003 | Stringer et al. |
| 2004/0184484 A1 | | 9/2004 | Marchok et al. |
| 2004/0246890 A1 | | 12/2004 | Marchok et al. |
| 2006/0034166 A1 | | 2/2006 | Marchok et al. |
| 2006/0229869 A1 | | 10/2006 | Nemer |
| 2007/0070960 A1 | | 3/2007 | Barak et al. |
| 2007/0110096 A1 | | 5/2007 | Geile et al. |
| 2008/0144487 A1 | | 6/2008 | Marchok et al. |
| 2008/0144731 A1 | | 6/2008 | Marchok et al. |
| 2008/0298483 A1 | | 12/2008 | Marchok et al. |
| 2009/0024387 A1 | | 1/2009 | Chandran et al. |

OTHER PUBLICATIONS

Kennedy, et al., "Direction Finding and "Smart Antennas" Using Software Radio Architectures," *IEEE Communications Magazine*, pp. 62-68 (May 1995).

Paulraj, "Antenna Array Signal Processing with Applications to Mobile Communications," *Second Workshop on Smart Antennas in Wireless Mobile Communications*, Stanford University, Stanford, California 94305, (Jul. 1995) pp. 1-120.

Russell, et al., "Terrestrial Digital Video Broadcasting for Mobile Reception Using OFDDM," *Wireless Personal Communications*, 2:45-66 (1995).

Swales, et al., "The Performance Enhancement of Multibeam Adaptive Base-Station Antennas for Cellular Land Mobile Radio Systems," *IEEE Transactions on Vehicular Technology*, 39(1):56-77 (Feb. 1990).

"Guide to Choosing a Wireless Base Station Antenna System," pp. 7-11 (date unknown).

Whittle, "The Optus Vision: Telephony, Internet, and Video," *Australian Communications*, 7 pages (1996).

"Cablespan 2300," Training Presentation, Tellabs, Inc., pp. 1-17 (1996).

Moose, "A Technique for Orthogonal Frequency Division Multiplexing Frequency Offset Correction," *IEEE Transactions on Communications*, vol. 42, No. 10 (1994).

Jacobsen, et al., "Synchronized DMT for Multipoint-to-point Communications on HFC Networks," *Information Systems Laboratory, IEEE Global Communications Conference in Singapore*, pp. 1-10 (1995).

IEEE Transactions on Acoustics, Speech and Signal Processing, vol. 28, No. 2, Apr. 1980, pp. 137-145, "Speech Enhancement Using a soft-Decision Noise Suppression Filter," Robert J. McCaulay and Marilyn L. Malpass.

IEEE Conference on Acoustics, Speech and Signal Processing, Apr. 1979, pp. 208-211, "Enhancement of Speech Corrupted by Acoustic Noise," M. Berouti, R. Schwartz and J. Makhoul.

Advanced Signal Processing and Digital Noise Reduction, 1996, Chapter 9, pp. 242-260, Saeed V. Vaseght (ISBN Wiley 0471958751).

Proceedings of the IEEE, vol. 67, No. 12, Dec. 1979, pp. 1586-1604, "Enhancement and Bandwidth Compression by Noisy Speech," Jake S. Lim and Alan V. Oppenheim.

\* cited by examiner

METHOD AND APPARATUS FOR INTERFERENCE SUPPRESSION IN ORTHOGONAL FREQUENCY DIVISION MULTIPLEXED (OFDM) WIRELESS COMMUNICATION SYSTEMS

CROSS-REFERENCE TO RELATED APPLICATIONS

Not Applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

In the last few years, the number of commercial cellular telephone users has risen dramatically, but the bandwidth allocated to cellular telephony has remained nearly constant. Because of the limited nature of cellular telephony bandwidth as a resource, the cost of obtaining bandwidth has risen dramatically. This necessitates the efficient utilization of available bandwidth resources to maintain commercial viability.

Many intelligent schemes for optimizing the use of available bandwidth resources have been proposed. These methods include such means as signal compression or elimination of non-essential frequency artifacts to reduce the overall bandwidth. Other systems include Time Division Multiple Access (TDMA) where multiple users utilize the same frequency band by transmitting bursts of data in specified periodic time slots or Code Division Multiple Access (CDMA) systems.

The use of Orthogonal Frequency Division Multiplexing (OFDM) as a modulation and multiple access method for commercial wireless communication systems is not widely practiced and is expected to grow in the future. Potential applications include wireless local loop, wireless local area networks and cellular and PCS systems. Possessing many of the benefits of well known time and code division multiple access systems, OFDM based multiple access systems are also referred to as Orthogonal Frequency Division Multiple Access (OFDMA) systems in the literature. Recently, OFDM was chosen as the modulation scheme for the European Digital Audio Broadcast (DAB) standard and the European Terrestrial Digital Video Broadcast (DVB-T) standard. OFDM based hybrid multiple access systems such as OFDM-TDMA and Multicarrier-CDMA are also being actively researched.

Such communication systems consist of a downlink and an uplink. The downlink is the unidirectional communication link from a single base-station (BS) to multiple remote (possibly mobile) transceivers. The uplink is the unidirectional communication link from these transceivers to the BS. Typically, the downlink and uplink occupy distinct non-overlapping frequency bands—also called frequency division duplex (FDD) operation. It is also possible to operate in time division duplex (TDD) ("ping-pong" or half-duplex mode) where the uplink and downlink occupy the same frequency band but alternate in time. This is generally preferred only for indoor systems. The uplink is a multiple access channel since the plurality of remote transceivers access or share the uplink channel resources. The downlink can be thought of as a broadcast or multicast link. In general, the problem of interference suppression is more difficult and important for the uplink since typically it represents the capacity bottleneck (compared to the downlink).

One of the major problems faced by wireless communication systems is that of interference. In particular, in OFDM systems, two main categories of interference are Inter-Bin Interference (IBI) and Co-channel Interference (CCI). IBI is the manifestation of loss of orthogonality between different bins of a OFDM system. Each data carrying bin acts as a source of interference (or noise) for every other data carrying bin. CCI refers to any other undesired signal whose spectrum overlaps with the spectrum of the particular OFDM system under consideration and causes interference. For example, sources of CCI may be other analog or digital communication/broadcast systems (which may or may not be using OFDM) operating in the same (or adjacent) frequency band in the same/nearby geographic areas. IBI and CCI can increase the bit-error-rate of the particular frequency bins that are experiencing the interference. As a result, the OFDM system performance may be degraded. Thus, interference suppression techniques are desirable for high-performance systems. A number of different techniques have been prepared to either avoid or suppress interference.

A factor which must be considered in multiple access wireless systems is that of power control or automatic gain control (AGC). Essentially, the receiver must be able to ensure that the received power of each bin is within a certain target range. This problem is made difficult by the presence of fading which can easily cause fluctuations in the received power in the range of 20-40 dB in a matter of seconds. Thus, in wireless systems, some basic power control mechanisms may be used. However, these power control mechanisms may not be perfect. Imperfect power control may exacerbate the effect of IBI.

If CCI is localized in frequency (i.e., narrowband CCI), the particular bin (or bins) that are affected such that the average signal-to interference-plus-noise ratio (SINR) is reduced below a certain threshold can be left unused. If the interference is temporary, the bin can be reused when the SNR improves. The basic procedure is well established in digital subscriber line (DSL) modems which use DMT as the modulation scheme. This procedure may be implemented by the BS in a wireless OFDM system by measuring any CCI across the frequency band of interest. However, the problem is more difficult in wireless systems because of the presence of fading which can also greatly reduce the SNR. Thus, the average SNR must be tracked. Fading results in fluctuations in the channel frequency response with time.

One measure of the rate of change of the channel response with time is given by the so-called Doppler spread (units of Hertz). When there is little relative movement between the receiver and transmitter (or when the propagation environment is relatively static), the multipath fading can be considered to be slow fading and the Doppler spread is around 5 Hz or less (this is not to be confused with the attenuation due to distance which also changes slowly, typically according to the log-normal distribution). In such cases (e.g. wireless local loop and indoor systems), the receiver can track and estimate the channel frequency response for each bin with good accuracy. This is typically accomplished via the use of periodic pilot sub-symbols inserted in the sub-symbol streams of each bin of interest. For example, for a given data carrying bin, every pth (say p=8 or 16) sub-symbol can be pilot (training) sub-symbol to estimate the channel periodically. For in-between sub-symbols, the receiver can estimate the channel by operating in decision directed mode or by interpolation. For fast fading channels (Doppler spread 10-200 Hz), estimating the channel is more difficult and sophisticated time-frequency interpolation techniques must be used (this is a drawback of OFDM).

Several techniques have been proposed in the literature for combating IBI and/or CCI. One method of addressing IBI is to space data carrying bins apart in frequency and leave bins unused there between. This is effective because: (a) the effect of IBI decreases with increase in frequency separation between bins and, (b) for a given total bandwidth, there are fewer active bins. However, this is wasteful of bandwidth and not a preferable solution. Another approach for addressing IBI and CCI is forward error correction (FEC) codes, mostly implemented in conjunction with interleaving. FEC codes may afford some protection against noise and interference. A related method is the use of Trellis coded modulation (TCM) to address IBI and CCI. However, the methods proposed heretofore have met with limited success. A need remains for an improved method and apparatus to overcome the problems associated with IBI and CCI.

One aspect of the present invention is targeted at interference suppression in the uplink of a FDD OFDMA system using spatial signal processing via antenna arrays deployed at the BS receiver. The present invention is not limited to FDD OFDMA, but may be to carry out interference suppression in other scenarios as well such as for hybrid OFDM-TDMA systems: Multicarrier-CDMA systems, TDD systems and in the downlink of the above systems.

SUMMARY OF THE INVENTION

The present invention affords a method and apparatus for suppression of CCI via the use of receive antenna arrays at the BS for the uplink channel. In addition, those skilled in the art will recognize that the application of this invention is not limited to the BS uplink channel, but is also applicable elsewhere including the BS downlink and at the remote transmitter/receivers. The intelligent use of antenna arrays for mitigating fading and interference is also referred to as "smart" or "intelligent antennas". Smart antenna systems may be carried out through the use of switched beam antennas or adaptive arrays (AA). Switched beam antennas use a fixed beamforming network to provide several output ports corresponding to beams in fixed directions. Signal levels in each beam are monitored and analyzed to switch the beams appropriately among different time or frequency channels depending on the air-interface scheme. Adaptive arrays, on the other hand, electronically steer a phased array by weighting the amplitude and phase of signal at each element in response to changes in the propagation environment. Adaptive arrays provide greater steering flexibility in response to the propagation environment. The preferred embodiment focuses on adaptive arrays. However, switched beam antennas may be used.

A first inventive aspect of the present invention involves an adaptive array (AA) architecture and methods for combating the effect of IBI and CCI over multipath fading channels. As described above, the solution is presented for the uplink of an OFDMA system with synchronous uplink, however, the present invention is not limited to OFDMA. A second inventive aspect involves a method for allocation of frequency bins (i.e., determining the spectral locations or bin numbers) to different users by taking spatial and other information (such as automatic gain control (AGC) information) into account. Each user may require one or more bins to meet a certain quality of service requirement. This aspect of the invention is most appropriate in the context of the adaptive array architecture described above but, in general, is not limited to such a receiver configuration as will be apparent to those skilled in the art.

For multi-element AA receivers, each element may have its own RF-to-baseband conversion and baseband demodulator. Of course, hardware optimizations may be possible. All beamforming and diversity combining algorithms operate on digital complex baseband signals, for instance via general purpose or application specific DSP's, ASIC's, in software (such as in software radios) or combinations thereof.

Consider slowly time-varying fading channels (SFC) first. This implies that the channel attenuation coefficients in each frequency bin can be taken to be constant over each symbol (a single complex number). Also, these coefficients may change from symbol to symbol but at a slow rate relative to the symbol rate. Some systems predominantly encounter SFC (e.g. indoor systems) while others encounter FFC's (e.g. cellular systems along highways). However, most wireless communication systems of interest experience a mix of SFC and FFC conditions.

Generally, wireless communications systems experience two primary types of signal fading within channels, slow time varying fading and fast time varying fading. The IBI due to the time-varying fading nature of a channel is negligible. IBI due to frequency offsets (imperfect synchronization) is still possible. A preferred embodiment of the present invention includes a AA with the elements spaced far apart (5 to 15 wavelengths) to obtain spatial diversity, i.e., independent fading at different antenna elements. The combining method of the preferred embodiment uses maximal ratio combining (MRC) to correct for IBI and Additive white Gaussian noise (AWGN). The MRC is merely a spatial matched filter. If an M element array is used, each bin has a separate M dimensional combining weight vector. To implement MRC, the channel frequency response for each bin may be estimated via periodic pilot sub-symbols. Note that the MRC also subsumes the role of the standard frequency equalization (FEQ) operation.

If CCI is also present, an optimal method (i.e., according to one specific criterion) is the so-called maximum SINR optimum combining (MSOC). This method also uses channel estimation. In addition, some statistics of the signal and interference must also be estimated. Periodic pilot sub-symbols can be used for both these tasks. MSOC has greater computational burden than MRC but greater potential for performance improvement.

For fast time-varying channels, implementing MSOC may require excessive bandwidth overhead for pilot sub-symbols. Basically, if MSOC is implemented on a FFC, it may not give any more benefit than if MRC was used. In fact, the performance can worsen if the channel coefficients are not tracked properly. Unfortunately, the method required to remedy this requires a different receiver architecture than above. Therefore, the receiver architecture has to be chosen to be one of the two and it may not be possible to change it on the fly unless the BS has a flexible software radio architecture. To avoid the foregoing problems, the preferred embodiment proposes the two-stage method as described below.

First, the antenna array is partitioned into sub-arrays. The elements of each sub-array are spaced close together (e.g., half wavelength or less to avoid spatial aliasing or grating lobes) to facilitate beamforming. Second, the individual sub-arrays are spaced far apart (e.g., 5-15 wavelengths) to obtain spatial diversity. The preferred embodiment uses each sub-array for beamforming for CCI suppression. Since the post-beamforming outputs from each sub-array may be largely affected by noise only, they can be diversity combined. Diversity combining can be done using MRC (which requires channel estimation). But channel estimation is expected to be easier in the second stage since the first stage is expected to greatly reduce the interference. No FEQ is required since the MRC essentially serves the role of a "multi-element" FEQ. If MRC is not feasible, switched diversity combining (SDC) may be used by measuring the instantaneous SNR for each sub-array's output and selecting the "best" option each symbol time (other variations are also possible). In this case, a standard FEQ is still required. As mentioned earlier, techniques for channel estimation via time-frequency patterns of pilots can be used in conjunction with the proposed AA architecture and an overall improvement in performance and/or reduction in complexity/bandwidth overhead of those algorithms is expected. Note that the use of this two-stage architecture and method is not limited to operation over FFC only and can be used over SFC as well instead of MSOC (but MSOC is very difficult to implement over FFC). Thus, the two-stage method can be considered to be more general. Nor is the number of elements in each sub-array or the number of sub-arrays limited. Increasing the number of elements in each sub-array can provide for more-optimal beamforming while increasing the number of sub-arrays outputs that are diversity combined can serve to further reduce interference. As an example, a preferred embodiment may have each sub-array made up of 4-8 elements with 2 sub-arrays for a total of 8-16 elements.

In addition, beamforming in stage 1 can be done according to any one of a number of criterion. The preferred embodiment uses direction-of-arrival (DOA) based constraints for beamforming. DOA based constraints may be used when signals are directional such as in rural or suburban environments, but are less desirable when the angle spread is large (such as in indoor environments).

A number of methods may be used for DOA estimation. For example, some remote transmitters may be equipped with GPS type equipment to enable the BS to compute this information. Other possible methods are the use of BS triangulation via time-difference-of-arrival (TDOA) measurements. One method to estimate DOA's of a given user is by using adjacent antenna array elements in each sub-array. The idea here is to extract the phase differences between complex baseband (symbol rate) samples from adjacent sensors or doublets. As mentioned above, the sensors in each sub-array are spaced a half-wavelength apart or closer to avoid spatial aliasing. For a range of channel scenarios, the fading experienced by adjacent sensors is almost perfectly correlated. For the range of signal bandwidths and RF carrier frequencies, the signals can be considered to be narrowband. Thus, when the signals are coherently downconverted and demodulated, a mutual phase offset is induced between the samples obtained from adjacent sensors. This phase offset is proportional to the inter-sensor spacing (normalized in wavelengths) and the sine of the DOA measured with respect to the normal to the array. This spatially induced phase offset is not only obtained for successive symbols, but also for all bins being used by a particular user. Thus, the measured phase offset can be smoothed in space (over multiple doublets in each sub-array and using multiple sub-arrays), in time (over a block of symbols), and in frequency (over multiple bins used by the same user) to mitigate the effect of noise. Note that since all array processing algorithms operate on complex baseband outputs, the processing can be efficiently done in the frequency domain. Also note that the AA receiver structures may also be implemented in conjunction with sectorized cells. For example, each cell can have 3-6 sectors and an AA receiver can be used within each sector. Of course, one of the advantages of AA in cellular/PCS systems is to achieve a reduction in the number of sectors per cell (which will improve the trunking efficiency) and still derive benefits of spatial separation between signals.

Generally, according to the preferred embodiment, the BS attempts to allocate bins to facilitate or augment the mitigation of IBI and CCI. In this method, the BS continually monitors a number of parameters and uses them to compute the bin allocations for a given user. Such allocations are typically made at start-up, but may also be made on-the-fly for non-constant bit-rate type applications. The allocations can also be changed dynamically in response to changes in the prevalent noise and interference conditions. For operation over SFC, deep fades may occur over portions of the signal spectrum (perhaps spanning several bins) for extended periods of time, perhaps seconds or even minutes. Bins can also be dynamically reassigned in such cases.

To be more specific, consider a system where signals are spatially localized (e.g. most cellular/PCS rural/suburban systems). Assume that the BS has estimates of the direction and received power of the dominant signal paths of all active users. Due to multipath communications, each user may have more than one distinct (and strong) multipath directions. The BS will typically set a limit on the number of dominant paths that it can take into account (such as 2 or 3) due to constraints in computation/memory etc. Such estimates can be computed as per discussion above or by pilots embedded in the sub-symbol streams of users. Similarly, the BS also computes the power and directions of CCI across the band of interest. For example, if the two stage receiver architecture described above is used, these directions and powers can be obtained from the beamforming coefficients used in each sub-array.

For example, assume that a particular user is to be allocated K bins. Using these inputs, the BS allocates bins to satisfy the following (desired) criteria:

1. The K bins belonging to any one user should be spaced as far apart in frequency as possible to minimize mutual IBI. Spacing the bins belonging to each user over a wide range of frequencies within the band also provides frequency diversity. Frequency diversity is desirable because it serves to lessen the effects of fading over a certain frequency range. For example, by allocating many widely spaced frequency bins to a single user, if the operating environment is such that some of the bins experience fading, the overall signal quality will still remain high because the other user bins will not experience this fading; in short, fading over a small frequency range within the band will not effect the whole signal.
2. Each bin is placed in a neighborhood with bins belonging to other users which are spaced as far apart as possible in the dominant DOAs of their signals. For example, a 3-5 bin neighborhood is expected to be suitable for most applications.
3. Each bin is placed in a neighborhood with bins belonging to other users such that differences in signal strength of active bins in the neighborhood are minimized.
4. Each bin is placed in a spectral location such that there are no co-channel interferers in the same frequency band. If no such locations are available, spectral locations are chosen based on the DOA of the CCI and the signal strength of the CCI. In general, CCI bins with lower CCI signal strength are assigned before bins with higher CCI signal strength. Also, bins are allocated so that the difference in the DOA's of the particular user and the CCI are as large as possible. These criteria are balanced depending upon the operating environment.

These criterion lead to better separation of potentially interfering signals in the spatial domain, thus facilitating the operation of spatial interference suppression techniques. The above criteria may be "weighted" differently to construct algorithms or flowcharts optimized for a specific (or category of) channel and interference scenarios, as will be apparent to those skilled in the art. For example. If IBI is the dominant impairment, items 1 and 2 above can be given the most importance. Item 3 is important if the system is operated in an environment with a wide range of received power levels. Similarly, if CCI is the dominant impairment, item 4 is given the highest priority. Since the number of bins in an OFDM can be quite large (several hundred bins is common), the implementation of the overall algorithm must be reasonably simple to enable execution in real-time. For instance, one possible way to implement it would be to construct a data structure which contains a table of information about each bin. This would include information such as whether the bin is active or inactive (at any given time), the user occupying the bin if any, whether it is a data, control or pilot bin, modulation scheme and constellation size of sub-symbols in the bin, received power level, dominant DOA's of the user occupying the bin, power level and DOA's of any co-channel interferers spectrally overlapping with the bin, etc. Note that all items of the above information may not be available or be able to be computed for each bin at all times. Certain of the above factors (like received power levels) appear to be best suited for update on a periodic (scheduled) basis (such as every n milliseconds or during each frame as per some existing framing structure). Other items are better suited for update in an event driven mode (such as user activity and constellation size), i.e., when a user arrives, departs, requests (or is forced to have) a change in the amount of allocated bandwidth.

Turning now to a more rigorous examination of uplink multiple access using OFDM. In an OFDMA system, the entire uplink bandwidth processed by a base-station is (dynamically) allocated among a group of users. While the downlink is always synchronous, unlike uplink TDMA systems in which remote units transmit in bursts in specified periodic time-slots, uplink OFDMA can be made synchronous using the method of loop-timing. In this method, each mobile transceiver first synchronizes itself to the base-station on the downlink and then derives its uplink transmitter timing reference from the recovered downlink clock. To facilitate the former task, the base-station embeds pilot tones in the transmitted downlink signal which are utilized by the remote receiver to "lock-on" to the base's timing reference. To overcome frequency selective fading across the signal bandwidth, multiple pilots can be used. While conventional baseband digital phase locked loops can be used for operation over slowly time-varying channels, for frequency acquisition and tracking algorithms suitable for operation over fast time-varying channels. The local timing reference for mobile transceivers are usually derived from a Voltage Controlled Crystal Oscillator (VCXO) which provides the timing reference for the receiver A/D, transmitter D/A and all radio frequency (RF) circuitry. Frequency offsets between the receive and transmit symbol clock occur due to non-idealities in the remote transceiver VCXOs, possibly of the order of several parts-per-million (ppm).

Assuming that the initial tasks of carrier frequency synchronization, symbol timing recovery and symbol time alignment have been completed this enables the base-station receiver to demodulate received baseband signals from all users with a single FFT. The base-station is also responsible for all bandwidth management functions to provide each unit with shared access to the uplink channel.

DESCRIPTION OF THE PREFERRED EMBODIMENTS

Figure 1A:
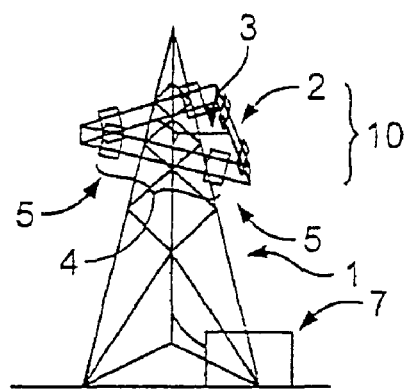
FIGS. 1a-1c illustrate a preferred embodiment of the adaptive antenna array architecture implemented for use in a cellular telephone system according to the present invention.

Initially, an explanation is provided of an OFDM transmission model before describing the preferred embodiments. Consider a discrete time OFDM system model in which N orthogonal sinusoids are transmitted each symbol time. The N bins are partitioned among a total of L independent users in non-overlapping sets of K ≜ N/L (assumed integer) bins for each user. Without loss of generality, a complex baseband representation is used for all signals. Thus, the normalized transmitted signal from the lth user is given by $$S_l(n) = \frac{1}{\sqrt{N}} \sum_{k \in S_l} a(k) e^{j\frac{2\pi}{N}kn}, \quad n \in [0, N-1], l \in [0, L-1] \quad (2.1)$$

where $j=\sqrt{-1}$; a(k) is the kth frequency domain sub-symbol typically selected from a quadrature amplitude modulation (QAM) constellation, and $S_l$ denotes the set of bin indices belonging to the lth user. With a sample rate $f_s$, assume that each user encounters a time-selective multipath fading channel impulse response (CIR) spanning a maximum duration $T_{CIR}=U/f_s$. Thus, the received signal after passing through the channel is given by, $$x_l(n) = \sum_{u=n}^{n-U+1} h_{u,l}(n) s_l(u), \quad l \in [0, L-1] \quad (2.2)$$

where $h_{u,l}(n)$ denotes the CIR for the lth user at time n due to the impulse δ(n−u). Note that slowly time-varying channels may be considered to be time-invariant over a symbol period leading to $h_{u,l}(n)=h_l(n-u)$. Using (2.1) in (2.2), $$x_l(n) = \frac{1}{\sqrt{N}} \sum_{u=0}^{U-1} h_{n-u,l}(n) \sum_{k \in S_l} a(k) e^{j\frac{2\pi}{N}k(n-u)}, \quad (2.3)$$

$$n \in [0, N-1], l \in [0, L-1]$$

Each symbol is prefixed with a cyclic prefix (CP) or guard time. The CP serves two main purposes. First, inter-symbol-interference is eliminated when the CP length is chosen to be longer than the CIR. Second, by appropriately selecting the transmitted samples of the CP, the transmitted signal appears periodic to the channel resulting in simplified frequency-domain equalization. This is done by setting $$s_l(-j) = s_l(N-j), j \in [1, G], l \in [0, L-1] \quad (2.4)$$

where G is chosen such that $T_{CP} \geq T_{CIR}$, i.e. $G \geq U$. In addition, the CP can also be utilized for synchronization purposes. At the receiver, the CP samples are discarded before demodulation and it is sufficient to consider each symbol independently. The received uplink signal at the base-station from all users is given by $$r(n) = \sum_{l=0}^{L-1} x_l(n) + v(n) + z(n) \quad (2.5)$$

where v(n) denotes discrete-time AWGN samples with variance $\sigma_v^2$ and z(n) denotes discrete-time CCI samples. After discarding the CP, (2.5) can be written compactly in matrix form for an entire symbol as, $$r = \sum_{l=0}^{L-1} \sum_{u=0}^{U-1} H_{u,l} T_l D_{u,l} a_l + v + z \quad (2.6)$$

where $r = [r(0), r(1), \ldots, r(N-1)]^T$ is the received signal vector; $a_l \in \mathbb{C}^K$; denotes the column vector of frequency domain sub-symbols from the lth user; $V = [v(0), v(1), \ldots, v(N-1)]^T \in \mathbb{C}^N$; $z = [z(0), z(1), \ldots, z(N-1)]^T \in \mathbb{C}^N$; $H_{u,l} = \text{diag}([h_{-u,l}(0), h_{-u+1,l}(1), \ldots, h_{-u+N-1,l}(N-1)]) \in \mathbb{C}^{N \times N}$, denotes the diagonal CIR matrix for the lth user and uth delay; $D_{u,l} \in \mathbb{C}^{K \times K}$ denotes a diagonal matrix of phase delays whose element corresponding to the kth bin is given by $$e^{-j\frac{2\pi}{N}ku}$$

and $T_l \in \mathbb{C}^{N \times K}$ denotes the inverse-DFT modulating matrix whose column corresponding to the kth bin is given by $$t_{l,k} = \frac{1}{\sqrt{N}} \left[1, e^{j\frac{2\pi}{N}k}, \ldots e^{j\frac{2\pi}{N}k(N-1)}\right]^T.$$

Turning our attention to the slowly time-varying channel, we begin by considering a slowly varying fading channel in which the impulse response may be taken to be time-invariant over a symbol period. This case illustrates the demodulating procedure and will also serve as a starting point for the rest of the analysis. Thus, $H_{u,l} = h_l(u) I_N$ where $h_l(u)$ is the uth impulse response coefficient. Using (2.6), the pth bin belonging to, say the lth user, is demodulated as $$y(p) = t_{l,p}^H r = \alpha_s(p) a(p) + \hat{v}(p) + \hat{z}(p), \quad p \in S_l \quad (2.7)$$

where, $$\alpha_s(p) = \sum_{u=0}^{U-1} h_l(u) e^{-j\frac{2\pi}{N}up} \quad (2.8)$$

and $\hat{v}(p)$ and $\hat{z}(p)$ denote the post-demodulation residual noise and CCI respectively. Thus, there is no fading induced IBI in this case. There are several methods for frequency-domain equalization ranging from no equalization at all (for instance, using differential-phase-shift-keying schemes such as D-QPSK), to sophisticated time-frequency adaptive filtering algorithms. The former are usually sufficient for slowly time-varying channels while the latter are used in more demanding environments.

Now consider the fast time-varying channel. As above, using (2.6), the pth bin belonging to, say the lth user, is demodulated as $$y(p) = \sum_{l=0}^{L-1} \sum_{u=0}^{U-1} t_{l,p}^H H_{u,l} T_l D_{u,l} a_l + t_{l,p}^H (v + z)$$

$$= \alpha_f(p) a(p) + i_f(p) + \hat{v}(p) + \hat{z}(p) \quad p \in S_l$$

where, $\alpha_f(p) = \frac{1}{N} \sum_{u=0}^{U-1} \sum_{n=0}^{N-1} h_{n-u,l}(n) e^{-j\frac{2\pi}{N}up}$ $$i_f(p) = \frac{1}{N} \sum_{l=0}^{L-1} \sum_{\substack{k \in S_l \\ k \neq p}} \sum_{u=0}^{U-1} \sum_{n=0}^{N-1} h_{n-u,l}(n) e^{j\frac{2\pi}{N}n(k-p)} e^{-j\frac{2\pi}{N}uk} a(k)$$

It is straightforward to show that the variance of $\hat{v}(p)$ equals $\sigma_v^2$ and the post-demodulation CCI variance is given by, $$\sigma_z^2(p) = E[|\hat{z}(p)|^2] = \sum_{n=-(N-1)}^{N-1} (1 - |n|/N) r_z(n) e^{-j\frac{2\pi}{N}np}$$

$$= P_z(w) * \left. \frac{\sin^2(Nw/2)}{N \sin^2(Nw/2)} \right|_{w=\frac{2\pi p}{N}}$$

where $E[\cdot]$ denotes the ensemble expectation; $r_z(\cdot)$ is the CCI discrete time auto-correlation function and $P_z(w)$ is the CCI power spectral density (PSD). Thus, for a given, say pth bin, the post-demodulation CCI is given by the convolution of the CCI PSD with a $\text{sinc}^2(\cdot)$ function evaluated at the corresponding angular frequency. Each demodulated sub-symbol is now corrupted by IBI from all other sub-symbols. The effect of IBI is damaging for even small values of Doppler spreads and frequency offsets and can severely limit the bit error rate performance. If the tone interferer is $f_t$ Hz away from the center of a particular bin, the normalized frequency offset is $f_t/f_{bin}$. This shape of the spectral leakage function is a direct consequence of using the discrete Fourier transform as the OFDM modulation basis function.

Consider now the effect of time-varying random frequency offsets due to imperfect transceiver synchronization and phase noise. This issue becomes particularly important when the synchronization problem is aggravated by fast time-varying channels, or for systems that are sensitive to power and complexity considerations. Let the normalized frequency offset be denoted by $\eta = f_{off}/f_{bin}$ where the inter-bin spacing $f_{bin} = f_s/N$. Each symbol time, $\eta$ is modeled as a realization of an independent uniformly distributed random variable in the interval $[-\eta_{MAX}, \eta_{MAX}]$. Thus, the demodulating vector with frequency offset is given by $J(\eta) t_{l,p}$ where $J(\eta) \in \mathbb{C}^{N \times N}$ denotes a diagonal offset matrix with nth element given by $$e^{j\left(\frac{2\pi}{N}n\eta+\beta\right)}$$

where $\beta\in[-\pi, \pi]$ denotes a phase offset varying from symbol to symbol. Thus, $$y(p) = \sum_{l=0}^{L-1}\sum_{u=0}^{U-1} t_{l,p}^H J^H(\eta)H_{u,l}T_lD_{u,l}a_l + t_{l,p}^H J^H(\eta)(v+z) \quad (2.9)$$

$$= \alpha_{f,\eta}(p)a(p) + i_{f,n}(p) + \hat{v}_\eta(p) + \hat{z}_n(p), \quad p \in S_l$$

where, (2.10)

$$\alpha_{f,\eta}(p) = \frac{1}{N}\sum_{u=0}^{U-1}\sum_{n=0}^{N-1} h_{n-u,l}(n)e^{j\left(\frac{2\pi}{N}n\eta+\beta\right)}e^{-j\frac{2\pi}{N}up}$$

$$i_{f,n}(p) = \frac{1}{N}\sum_{l=0}^{L-1}\sum_{\substack{k\in S_l\\k\neq p}}\sum_{u=0}^{U-1}\sum_{n=0}^{N-1} h_{n-u,l}(n)e^{j\left(\frac{2\pi}{N}n(k-p+\eta)+\beta\right)}e^{-j\frac{2\pi}{N}uk}a(k)$$

The SINR for the pth bin is defined as $$SINR(p) = \frac{E[|\alpha_{f,n}(p)a(p)|^2]}{E[|i_{f,n}(p) + \hat{z}_\eta(p)|^2] + \sigma_v^2} \quad (2.11)$$

Assuming a wide sense stationary uncorrelated scattering (WSSUS) multipath fading model and a Rayleigh fading Doppler spectrum [13], expressions for signal and interference powers in (2.11) appear in the Appendix.

We now turn to an analysis of the reception of the antenna array receiver. In conventional single-antenna wireless OFDM receivers, FFT based demodulation is generally followed by frequency domain equalization (FEQ) and subsequent mapping of the equalized frequency domain sub-symbols to bits. In an adaptive array OFDM receiver, demodulator outputs from each sub-array element are fed into a bank of array combiners where a separate array combining vector is used for each bin. We propose the use of the maximum STNR criterion and constraint based beamforming for weight adaptation under appropriate channel conditions as described later in this section. In the former method, channel estimation is necessary and antennas are widely spaced to obtain independent fading between elements. (i.e., spatial diversity) To maximize the SINR at the output of the array, the optimum weight vector balances diversity and interference suppression. In the latter approach, antenna elements are spaced sufficiently close to prevent spatial aliasing (i.e. grating lobes) and facilitate the application of constraints, such as those derived from estimates of direction-of-arrival (DOA) of impinging signals. (i.e., the four factors discussed above).

Considering reception over slowly time-varying. For a given data rate and bandwidth, the ratio of symbol rate to fading rate (or Doppler spread) in OFDM is much smaller compared to single-carrier systems. For example, with a typical OFDM symbol rate of 4 KHz and with a Doppler spread of 200 Hz, the ratio is 20 (the same ratio for the IS-136 TDMA system having a 24.3 KHz symbol rate is about six times greater). For the maximum SINR method to be effective, the temporal averaging used to estimate the noise-plus-interference statistics must be done over a time duration much smaller than the duration over which the fading changes significantly. Channel estimates for each antenna element are also required. Moreover, this procedure has to be carried out separately for every data carrying bin. Thus, this approach is suitable only for OFDM systems with slow time-varying fading, for example in low mobility scenarios.

Thus, we utilize statistically optimum array combining as per the maximum SINR criterion for operation over slowly fading channels. With an M element array receiver depicted in FIG. 5, let the CIR matrix for the mth element user be denoted by $H_{u,l}^{(m)} = h_l^{(m)}(u)I_N$. The array elements are spaced sufficiently apart to obtain uncorrelated fading. The corresponding received signal is given by $$r^{(m)} = \sum_{l=0}^{L-1}\sum_{u=0}^{U-1} h_l^{(m)}(u)T_lD_{u,l}a_l + v^{(m)} + \sum_e z_e^{(m)} \quad (3.1)$$

where $z_e^{(m)}$ denotes the eth CCI component received at the mth sub-array. Thus, the demodulated signal at the output of the mth element is given by $$y^{(m)}(p) = \sum_{l=0}^{L-1}\sum_{u=0}^{U-1} t_{l,p}^H J^H(\eta)h_l^{(m)}(u)T_lD_{u,l}a + t_{l,p}^H J^H(\eta)\left(v^{(m)} + \sum_e z_e^{(m)}\right)$$

$$= \alpha_{s,\eta}^{(m)}(p)a(p) + i_{s,n}^{(m)}(p) + \hat{v}_\eta^{(m)} + \sum_e \hat{z}_{e,n}^{(m)}(p)$$

where $\alpha_{s,\eta}(p)$ and $i_{s,n}^{(m)}(p)$ are given by setting $h_{n-u,l}(n)$ to $h_l^{(m)}(u)$ in (2.10). Denoting the vector of demodulated pth bin outputs from all M elements as $y(p) = [y^{(0)}(p), y^{(1)}(p), \ldots y^{(M-1)}(p)]^T$ and the estimated pth sub-symbol is obtained as $$\hat{a}(p) = w^H(p)y(p) \quad (3.2)$$

The optimum weight vector for (3.2) above which maximizes the SINR at the output of the array is given by $$w_{opt}(p) = \gamma(p)R_y^{-1}(p)\Lambda(p) \quad (3.3)$$

where $\gamma(p)$ is a constant (not affecting the output SINR); $R_y(p) \in C^{M \times M}$ is the received data covariance matrix and $\Lambda(p) = [\alpha_{s,n}^{(0)}(p), \alpha_{s,n}^{(1)}(p), \ldots, \alpha_{s,n}^{(M-1)}(p)]^T$ is the propagation vector for the pth bin. Simulation results with various parameters appear in Section IV. $R_y(p)$ and $\Lambda(p)$ are estimated by periodic pilot sub-symbols inserted in the each active bin. A number of techniques can be used for channel estimation ($\Lambda(p)$) using data directed (i.e. training sequence) or decision directed operation taking into account the time-frequency dispersive characteristics of the channel.

In this case, constraint based beamforming is used with the constraints chosen such that their rate of change is significantly slower than the data rate. This approach also allows for flexible and general constraints, albeit at the expense of higher computation required for their generation. In the sequel, DOA based constraints are used to exploit angle diversity. To enable the simultaneous exploitation spatial and angle diversity, the base-station array is partitioned into multiple sub-arrays. While the elements within each sub-array are closely spaced, the individual sub-arrays are spaced far apart. This allows for combined use of angle diversity (via constraint based beamforming in each sub-array) and spatial diversity (via diversity combining of all sub-array outputs). Thus, consider a base-station antenna array configuration comprised of M sub-arrays, each with S elements, for a total of MS elements. For an inter-element spacing of $\rho$ and narrowband signal wavelength $\lambda$, the fading experienced at adjacent sensors is almost perfectly correlated for sufficiently small values of $\rho/\lambda$ (such as 0.5 or less) and angle spreading (around 5° -10° or less). Thus, the inter-element spacing within each sub-array $\rho$ is chosen to facilitate beamforming.

A large inter sub-array spacing, on the other hand, is chosen to obtain a spatial diversity gain. For example, a spacing of 5 $\lambda$ to 10 $\lambda$ or more is regarded to be adequate for obtaining sufficiently low fading correlation. Note that conventional beamforming only, or diversity combining only arrays are special cases of this configuration with M=1 and S=1 respectively. If maximal ratio combining (MRC) is used for combining outputs from different sub-arrays in the second stage, a separate FEQ is not needed. On the other hand, if switched diversity combining is used, a FEQ is still required. Thus, if channel estimation is to be eliminated, switched diversity is appropriate in conjunction with differential signaling.

For typical cellular systems, the rate of change of DOAs is much lower than the symbol rate allowing for the use of only a few pilot bins to obtain DOA estimates. Moreover, each of these constraints can be utilized for multiple bins, thus greatly reducing the total computational burden for constraint generation. Another key advantage of DOA based beamforming is that since DOA information is independent of carrier frequency, the information can be re-used for downlink beamforming as well. In addition to conventional algorithms, DOA estimation techniques based on time-difference-of-arrival and multiple base-station triangulation are also emerging resulting information can also be utilized for other tasks such as mobile hand-offs and geolocation.

Extending the notation of the previous section, let the CIR matrix for the mth sub-array be denoted by $H_{u,l}^{(m)}$. The received signal at the sth element of the mth sub-array in the presence of spatially directional desired signals and CCI is given by $$r^{(m,s)} = \sum_{l=0}^{L-1} c_l^{(m,s)} \sum_{u=0}^{U-1} H_{u,l}^{(m)} T_l D_{u,l} a_l + v^{(m,s)} + \sum_e c_e^{(m,s)} z_e^{(m,s)} \quad (3.4)$$

where $c_l^{(m,s)}$ and $C_e^{(m,s)}$ denote the multiplicative factors which can be factored out in the sth sensor's response of the mth sub-array with respect to the reference sensor (s=0) for the lth user and eth CCI component respectively. For instance, if the signals are assumed to emerge from point sources, $c_l^{(m,s)}=e^{js\phi_p}$; p$\in$S$_l$ and $c_e^{(m,s)}=e^{js\phi_e}$ where $\phi_p$ and $\phi_e$ denote the spatial DOA's given by $\phi_p 2\pi(\rho/\lambda)$ sin ($\theta_p$), p$\in$S$_l$ and $\phi_e=2\pi$ ($\rho/\lambda$) sin ($\theta_e$) corresponding to DOA's $\phi_p$ and $\phi_e$ of the particular desired signal and CCI respectively. If the sources are assumed to be in the array far-field, the directions can be assumed to be unchanged with respect to each sub-array's reference element. Thus, the demodulated signal at the output of the (m, s)th element is given by $$y^{(m,s)}(p) = \sum_{l=0}^{L-1} \sum_{u=0}^{U-1} t_{l,p}^H c_l^{(m,s)} J^H(\eta) H_{u,l}^{(m)} T_l D_{u,l} a_l + \quad (3.5)$$

$$t_{l,p}^H J^H(\eta) \left( v^{(m,s)} + \sum_e c_e^{(m,s)} z_e^{(m,s)} \right)$$

$$= c_l^{(m,s)} \alpha_{f,n}(p) a(p) + i_{f,n}^{(m,s)}(p) + \hat{v}_\eta^{(m,s)}(p) + \sum_e c_e^{(m,s)} \hat{z}_{e,\eta}^{(m,s)}(p)$$

where $\alpha_{f,n}(p)$ is given by (2.9) and $$i_{f,n}^{(m,s)}(p) = \frac{1}{N} \sum_{l=0}^{L-1} \sum_{\substack{k \in S_l \\ k \neq p}} \sum_{u=0}^{U-1} \sum_{n=0}^{N-1} c_l^{(s)} h_{n-u,l}^{(m)}(n) e^{j\frac{2\pi}{N}n(k-p+\eta)+\beta)} e^{-j\frac{2\pi}{N}uk} a(k)$$

A single DOA estimation and beamforming processor is shared between all sub-arrays. DOAs of the received signal's dominant path (and possibly other secondary multipath components) are assigned to sub-arrays to enable computation and update of their respective weight vectors. Also, the same weight vector may be used for more than one sub-array if secondary paths are unused (or for economy of implementation). Let $w_b^{(m)}(p) \in C^s$ denote the pth bin's beamforming vector for the mth sub-array. The mth sub-array output is given by $$\bar{a}^{(m)}(p) = [w_b^{(m)}(p)]^H y^{(m)}(p)$$

where $Y^{(m)}(p)=[y^{(m,0)}(p), y^{(m,1)}(p), \ldots, y^{(m,S-1)}(p)]^T$ We formulate the solution for $w_b^{(m)}(p)$ using the well known generalized sidelobe canceler (GSC) framework. The GSC formulation of the beam-former is particularly useful since it readily lends itself to recursive implementations using standard LMS or RLS type algorithms, or via block sample covariance matrix inversion. The GCS uses a constrained output energy minimization criterion and under a signal preserving constraint, it yields the corresponding MMSE solution for beamformer weights. The constrained optimization problem may be formulated as, $$w_b^{(m)}(p) = arg \min_w w^H R_y^{(m)}(p)w \text{ subject to } [C^{(m)}]_p^H w = f \quad (3.6)$$

where $C_p^{(m)}$ is the constraint matrix whose columns represent multiple constraints; f is the desired constraint response; $R_y^{(m)}(p)=R_s^{(m)}(p)+R_i^{(m)}(p)+R_v+R_z^{(m)}(p); R_y^{(m)}(p) \in C^{S \times S}$; is the pth bin's received data covariance matrix for the mth sub-array and $R_s^{(m)}(p), R_i^{(m)}(p), R_v=\sigma_v^2 I_s$ and $R_z^{(m)}(p)$ denote the corresponding signal, IBI, additive noise and CCI covariance matrices respectively. The GCS solution to (3.6) is well known [9, 25] and is given by $$w_b^m(p)=w_q^{(m)}(p)-C_{p,a}^{(m)}w_a^{(m)}(p) \text{ where}$$

$$w_b^{(m)}(p)=(C_{p,a}^{(m)H} R_y^{(m)}(p) C_{p,a}^{(m)})^{-1} C_{p,a}^{(m)H} R_y^{(m)}(p)$$
$$w_q^{(m)}(p) \quad (3.7)$$

$w_q^{(m)}(p)=C_p^{(m)}[C_p^{(m)H}C_p^{(m)}]^{-1}$ f and $C_{p,a}^{(m)} \in C^{S \times S_c}$ is the matrix spanning the null space of $C_p^{(m)}$ where $S_c$<S is the number of constraints used. If only one signal preserving constraint is used, $C_p^{(m)}=d^m(p)$ and f=1 where $d^m(p)$ denotes the chosen estimated steering vector of the desired user. The output SINR with the mth beamformer is given as $$SINR^m(p) = \frac{[w_b^{(m)}]^H(p) R_s^{(m)}(p) w_b^{(m)}(p)}{[w_b^{(m)}]^H(p)(R_i^{(m)}(p) + R_v + R_z^{(m)}(p)) w_b^{(m)}(p)}$$

To determine the performance gain which may be obtained from diversity combining, let the average signal-to-noise ratio per bit at each sub-array output be denoted by $\bar{\gamma}b$. Assuming uncorrelated Rayleigh distributed received signals, the average probability of bit error ($\bar{P}_b$) for coherent PSK sub-symbols using MRC is given by $$\bar{P}bMRC = [P(\bar{\gamma}_b)]^M \sum_{m=1}^{M} \binom{M-2+m}{m-1} [1 + P(\bar{\gamma}_b)]^{m-1} \quad (3.8)$$

where $P(\bar{\gamma}_b)$ denotes the probability of error for a specific alphabet size. For example, if the probability of error in a AWGN channel is given by aerfc ($\sqrt{b\gamma_b}$), then by averaging over the probability density function of $\gamma_b$, $P(\bar{\gamma}_b) \approx a/(2b\bar{\gamma}_b)$ Channel estimation for MRC is performed on post-beamforming outputs from each sub-array which greatly minimizes the impact of CCI on the channel estimates.

The joint space-frequency bin allocation scheme automatically determines bin allocations for mobile users taking the spatial dimension into account. Spectral locations are sought for each bin such that the K bins belonging to any one user are spaced as far apart in frequency as possible to minimize mutual IBI. Spacing the bins belonging to each user over a range of frequencies also increases frequency diversity (i.e., because the bins of a particular user are spaced in frequency, typical CCI sources operating in a small, in-band frequency range have less effect on the overall signal then if the signal bins were closely grouped in frequency.) Also, each bin is co-located with bins belonging to other users which are spaced as far apart as possible in the DOAs of their signals. This enables the beamformer to suppress IBI between adjacent bins by exploiting spatial selectivity.

Accomplishing these goals simultaneously at each arrival (when a new user requires bin allotment) or departure (when an existing user terminates its connection) can be a computationally formidable task due to the typically large number of bins and users. The following method is proposed which sequentially solves the above problem in an efficient manner. To begin, the entire spectrum is partitioned into K contiguous frequency blocks containing L bins. Every user is allotted one bin in each of the K blocks and spatial information is used to determine the bin distribution within each block. If $\psi$ denotes the dominant DOA of the pth user, the bin placement in any one block is done by computing the following metric for each available bin as $$n_p = \underset{n}{\operatorname{argmax}} \underset{i}{\operatorname{min}} \Delta\theta_{n,i} \quad (3.9)$$

where $$\Delta\theta_{n,i} = |\psi - \theta(n-i)| \; i \in [-W, W], i \neq 0 \quad (3.10)$$

is the magnitude of the differences between $\psi$ and DOAs of bins in a neighborhood of 2 W bins. If an adjacent bin is unoccupied, the corresponding value of $\Delta\theta_{n,i}$ is set to the maximum angular difference possible. Note that owing to the block structure of bin allocation, it is sufficient to compute the metric for any one block and replicate the bin allotment in the remaining blocks. Moreover, the objective function is easy to compute and can be maintained in a tabular form for fast look-up. These metrics are updated whenever there is an user arrival or departure. In severe multipath environments, the spatial selection is generalized by taking into account multiple DOAs as well as power levels for each bin in computing the windowed DOA difference for each bin. In propagation environments dominated by CCI instead of (or in addition to) IBI, the above criterion can take into account the DOA and frequency location, as well as signal strength, of co-channel interferes to minimize the effect of spectral overlap and leakage.

Consider an example wireless OFDM system with the following parameters: Total number of bins N=256; Useful symbol time $T_{sym}$=230 µs; CP or guard time $T_{CP}$=20 µs and symbol rate $f_{sym}$=1/($T_{sym}$+$T_{CP}$)=4 KHz. Thus, inter-bin spacing $f_{bin}$=1/$T_{sym}$=4.348 KHz and total occupied bandwidth N $f_{bin}$=1.11 MHz. Using QPSK modulated sub-symbols, the aggregate data rate (2 bits/bin) (N bins/symbol) ($f_{sym}$ symbols/sec)=2.048 Mb/s. For an uplink multiple access system with these parameters, L=32 independent users, each with K=8 bins can each be allocated a raw bit rate of 64 Kb/s. Other factors which can reduce the user available data rate or the number of usable bins include analog and digital filtering constraints, spectral mask requirements, and bandwidth overhead for control and signaling.

Consider first the effect of IBI only without additive noise and CCI. In this application, it is known that M-branch spatial diversity using MRC (M 2,3) is very effective. This result is not surprising since IBI is spatially and spectrally distributed and MRC is known to be the optimum array combining method in the presence of noise only.

Consider now the performance of maximum SINR optimum array combining for CCI suppression on a slowly time-varying channel. For M=2, both MRC and maximum SINR combining yield similar performance and a 3 dB array processing gain is obtained for AWGN only (when CCI is negligible).

For a given number of total elements, combined use of angle and spatial diversity is clearly superior to angle diversity alone. It is known that diversity combining is most beneficial at relatively higher input SINRs while beamforming is most effective for relatively lower SINR's when the interference is strong.

Figure 1B:
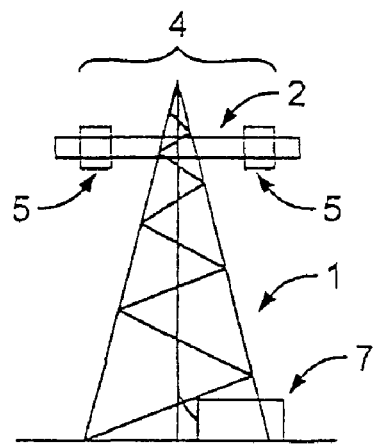
Figure 1C:
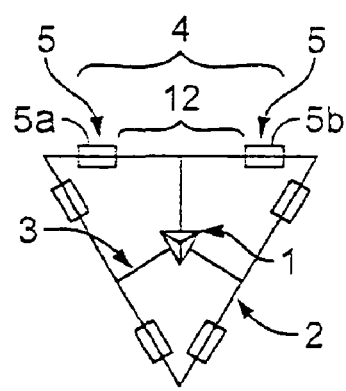

Now the discussion turns to the preferred embodiment. FIG. 1 illustrates one exemplary embodiment of an adaptive array architecture 10 with a base station 7 implemented for use in a cellular telephone system according to the present invention. An array support structure 1, may be implemented as single or multiple towers as shown or by any other means that enable the array to be placed at the desired elevation and spacing including but not limited to conical towers or fixation on commercial buildings of sufficient elevation. In the preferred embodiment, the array support structure 1 is attached to the array fixation structure 2 by means of support beams 3. The array support structure 1 thus maintains the array fixation structure 2 at a fixed elevation. In the embodiment of FIGS. 1a-1c, the array fixation structure 2 is arranged in the shape of a triangle, thereby dividing the complete 360° service area into three sectors of 120° each. By way of example only, each 120° sector constitutes a single adaptive array 4, each adaptive array being comprised, by way of example only, of two sub-arrays 5. The array structure may be varied without departing from the present invention. For instance, the service area may be divided into differing numbers of sectors, the number of sub-arrays may be increased or their orientation changed. The sectors need not be equal in size. Each sub-array is electrically connected to a base station 7 which may be located on the tower as shown or at any other convenient location including mounted on the array fixation structure 2 or in an enclosed area at the base of the array support structure 1.

In each adaptive array, the sub-arrays are separated by a distance sufficient to allow the resultant signals from each sub-array to be spatial diversity combined. Spatial diversity requires a sufficient element spacing to allow independent fading at different elements. The signals from such spaced elements can be combined to lessen interference and increase the received signal strength. For spatial diversity combining to be effective at the effective operating distance of a cellular telephony system, an array spacing of at least 2 wavelengths at the frequency of operation is beneficial with the spacing preferably between 5 to 15 wavelengths. In the present embodiment, the minimum group spacing 12 is in the range of 5-15 wavelengths.

Figure 2A:
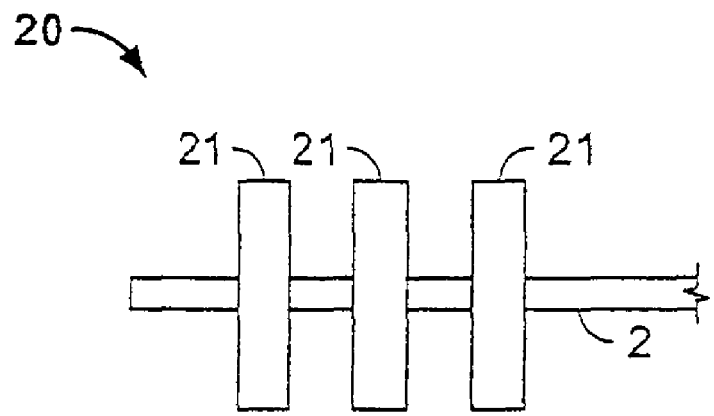
FIGS. 2a-2b illustrate a preferred embodiment of the sub-array of the adaptive antenna array architecture of FIG. 1.
Figure 2B:
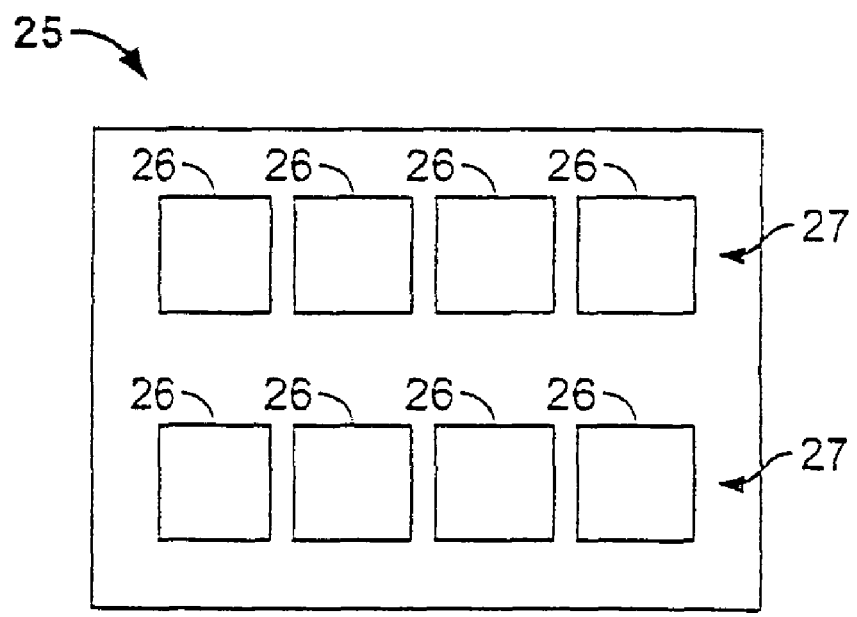

FIGS. 2a and 2b, illustrate exemplary geometries that may be used for the sub-arrays 5. By way of example only, the sub-array 5 may be implemented as a dipole array 20 comprised of three antenna array elements 21 oriented vertically and arranged side-by-side. The spacing between the antenna array elements 21, in this embodiment, is less than a predetermined maximum element spacing, for example, one half of one wavelength at the frequency of operation ($<\lambda/2$) to facilitate steering. Steering or beamforming is the ability of the signal response of an array to be altered through modification of the timing or phasing of the array elements; for instance, by altering the phasing of array elements the array can be made to receive desired user signals at a higher grain while at the same time damping undesired interference signals. To provide effective steering, the elements should be spaced as close as possible; the element spacing must be less than a wavelength and classically less and one-half of one wavelength to provide steering.

The antenna array elements 21 are attached to and supported by the array fixation structure 2 and are electrically connected to the base station 7. Sub array 5 may also be implemented as a microstrip patch array 25 (as shown in FIG. 2b). Microstrip patch array 25 may be configured as a Butler array comprised of eight total patches 26 arranged in patch rows 27 of four patches each. As in the dipole array 20, each of the patches 26 in a given patch row 27, in this preferred embodiment is separated by less than the maximum element spacing, for example, one half of one wavelength at the frequency of operation ($<\lambda/2$) to facilitate steering. Alternatively, the microstrip patch array 25 may be replaced with two dipole antenna elements arranged horizontally side-by side that provide a similar signal response pattern. The microstrip patch array 25 may be desirable because of its low manufacturing cost in some applications.

Figure 3:
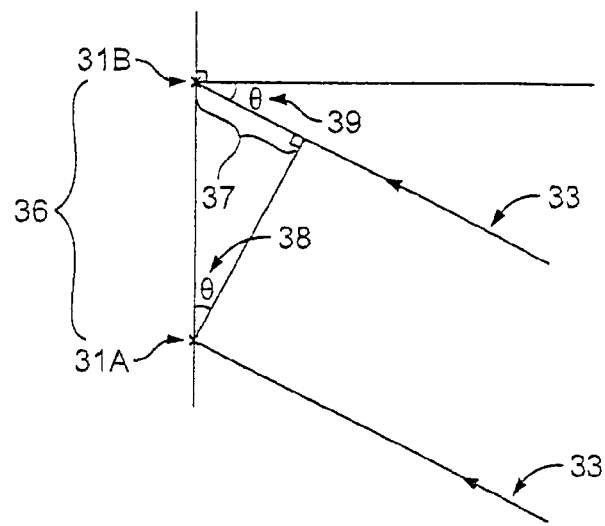
FIG. 3 illustrates, graphically, a method for determining the direction of arrival of received signals or co-channel interference.

FIG. 3 graphically illustrates the manner by which the base station 7 determines the direction of arrival of either a remote unit or a source of co-channel interference. FIG. 3 illustrates a top view of a sub-array 5 comprised of two antenna array elements 31a and 31b arranged vertically side-by-side with a separation less than $\lambda/2$. Incoming signal 33 from a user impinges upon the antenna array elements 31a and 31b. Because the incoming signal 33 is arriving from a large distance relative to the separation between elements 31a and 31b, the far field approximation (the signal source is so far away from the receiver that the incident waves appear as plane waves) is valid and the incoming signal 33 can be approximated as impinging upon array elements 31a and 31b at the same angle. The additional signal travel distance 37 that the incoming signal 33 must travel to impinge upon the more distant of the array elements 31b can be calculated in several ways, such as by time delay or phase shift. Because the separation between the array elements 31a and 31b is also known, the sine of angle 38 may be calculated and is equal to direction of arrival 39 normal to the sub-array 5. The base station 7 then computes the direction of arrival.

Although the exemplary embodiment contains two elements, it will be obvious to those skilled in the art that the direction of arrival may be calculated by means of many different methods. The accuracy of the determination of the direction of arrival is, of course, dependant upon the method used. In general, a greater number of antenna elements can provide greater resolution of the direction of arrival. Thus, the BS 7 could distinguish between remote users who are disposed closer together with regard to direction of arrival. Determination of the direction of arrival is also dependant upon the filter used by the BS 7. In addition, the BS 7 may utilize a number of multipath signals to determine direction of arrival. In this case, the direction of arrival may be along multiple paths.

Figures 4A, 4B:
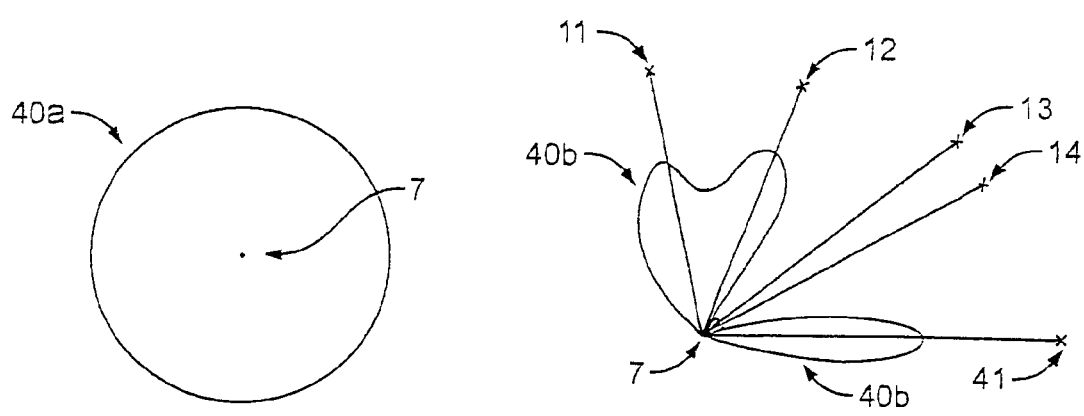
FIGS. 4a and 4b illustrate exemplary signal response patterns of the adaptive antenna array as modified according to the present invention to focus the gain at multi-path reception points and reduce the gain at points of co-channel interference.

FIGS. 4a and 4b illustrate a general signal response pattern in FIG. 4a as well as, in FIG. 4b, a signal response pattern modified to provide higher gain to desired user signals while damping interference. FIG. 4b illustrates exemplary signal response patterns of the adaptive array, along with multi-path reception and co-channel interference. Multi-path reception refers to an individual user's signal that is received by the BS from more than one direction such as when user signals are reflected from structures in an urban environment. Co-channel interference (CCI) refers to any other undesired signal whose spectrum overlaps with the spectrum of the particular OFDM system under consideration and causes interference. An idealized signal response pattern is shown as 40a in FIG. 4a. The radius of the response pattern 40a from the BS 7 in a given angular direction indicates the relative gain or signal response level of the BS in that radial direction. Thus, in the response pattern 40a, the adaptive array receives with equal strength signals from any direction. This response may be seen to be less than ideal when operating in the presence of CCI because it is desired to minimize or "damp out" undesired CCI to increase system performance while increasing the gain for desired signals. Thus, the signal response pattern 40a is altered.

Once the direction of arrival of a communications signal from a remote user is known, the array elements can be energized or their responses placed through a filter with varying phases, time delays or both to produce the signal response pattern 40b in FIG. 4b. Again, in signal response pattern 40b the radial distance of the response pattern 40b from BS 7 is indicative of the relative gain or signal response level in that radial direction. The BS 7 modifies the idealized pattern to provide increased gain for the signals of user 41 as well as the multi-path propagation 11, 12 of the signals of user 41. At the same time, the signal response pattern provides for damping in the direction of CCIs 13 and 14 to minimize received interference signals.

Figure 5:
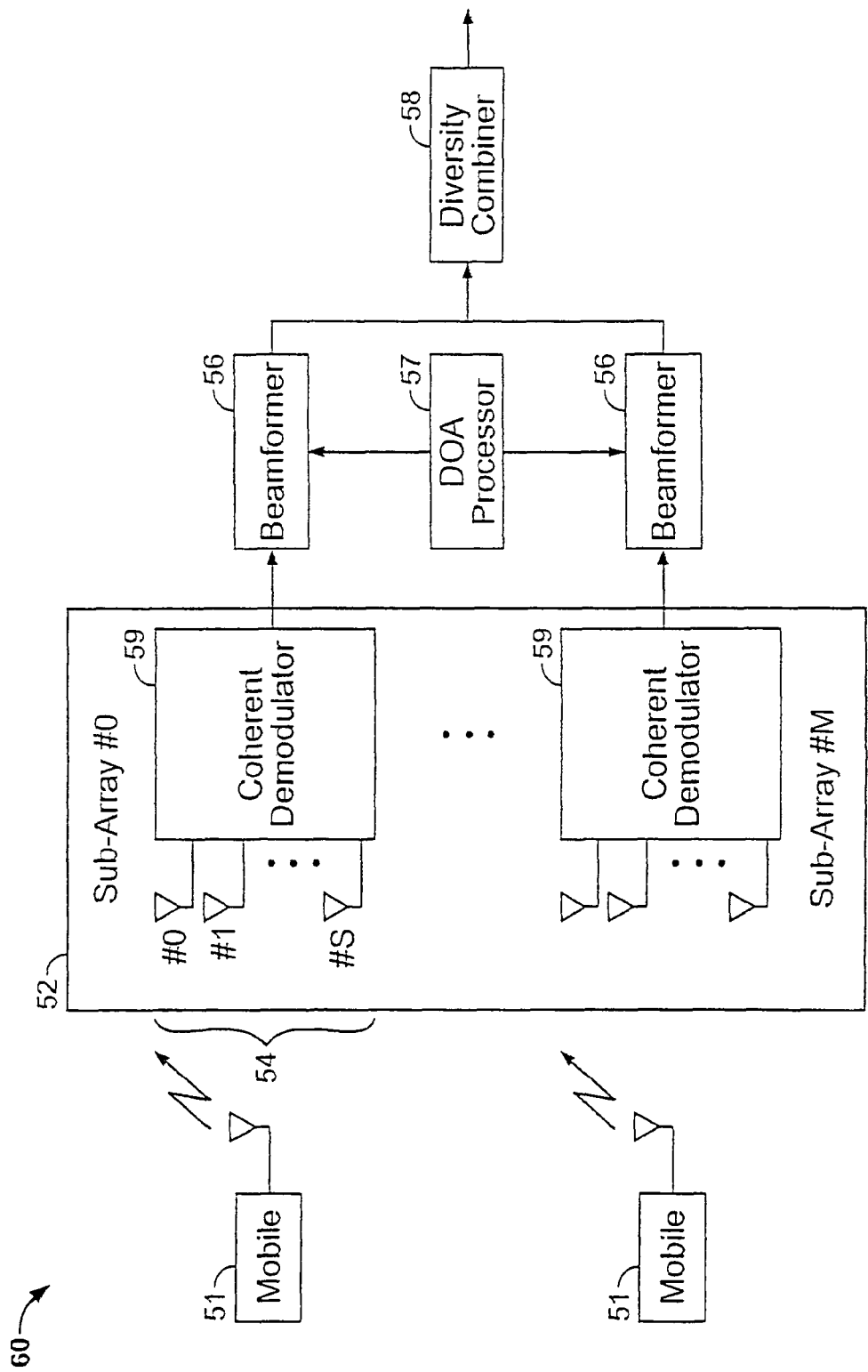
FIG. 5 is a general block diagram of the adaptive antenna array architecture of the embodiment of FIG. 1.

FIG. 5 is a block diagram of an exemplary embodiment of a receiver 60 for the adaptive antenna array architecture 10. The receiver 60 is capable of correcting for incoming channels which experience fast time-varying fading. The receiver 60 illustrates two stages of an array. Signals from mobile users 51 impinge upon the adaptive array 52 comprised of a plurality of sub-arrays 59 numbered 0 to M. Each sub-array 59 comprises a plurality of elements 54 numbered 0 to S. The number of elements 54 in each sub-array 59 may not be equal. Each sub-array 59 can handle signals from many mobile users 51 at the same time. At each sub-array 59, the signals from mobile users 51 pass through coherent demodulators to beamformers 56 which are supplied with direction of arrival data from the DOA processor 57 in the BS 7 to construct the desired signal response pattern. The DOA processor 57 calculates the direction of arrival in accordance with the method described above in connection with FIG. 3. The output signals from the beamformers 56 are passed through a spatial diversity combiner 58 to remove interference. The output signal from the spatial diversity combiner 58 may be fed into a standard voice or data network.

In an alternative embodiment, the adaptive antenna array architecture 10 may be used in an orthogonal frequency division multiple access (OFDMA) system. The base station 7 determines the direction of arrival (DOA) in the manner described above. The base station 7 of the OFDMA system segments the available bandwidth into multiple frequency bins which can then be allocated based on predetermined factors. The inclusion of the DOA as a factor in an OFDMA bin allocation scheme improves overall system performance by allowing the OFDMA bin allocation algorithm to differentiate between user signals on the basis of DOA as well as differentiate between the DOA of CCIs and user signals thus providing for less overall CCI and Inter-Bin Interference (IBI).

Figure 6:
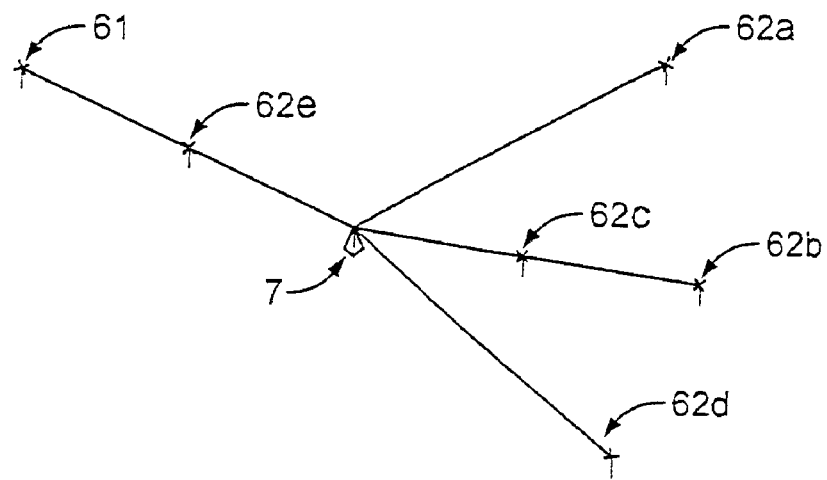
FIG. 6 illustrates a typical environment for operation of the adaptive antenna array architecture of the embodiment of FIG. 1 including the geographic positioning of multiple users and co-channel interference.

FIG. 6 illustrates an exemplary operating environment for a cellular system. The base station 7 is operating in the presence of signals from co-channel interferer 61 and signals from mobile users 62a, 62b, 62c, 62d and 62e.

The direction of arrival of all signals relative to the base station 7 can be observed as lines leading from the spatial positions of the various signals to BS 7. Mobile users 62c and 62b have substantially the same DOA, while mobile user 62e and co-channel interferer 61 have substantially the same DOA. Also, mobile users 62a, 62b, and 62c are located at approximately the same distance from base station 10 and thus have approximately the same signal strength.

While, in this exemplary environment, the DOA of each signal is shown as a straight line from the remote unit, in a more complex implementation of the present invention the BS 7 may take into account multipath signals of a certain magnitude (usually not more than two or three signal paths for computational simplicity) as well as accounting for the angle spreads of the incident signal wither directly from the remote unit or multipath. For ease of representation, the exemplary environment of FIG. 6 shows dominant, straight-line signal paths from the remote units and the CCI without angle spreading.

Figure 7:
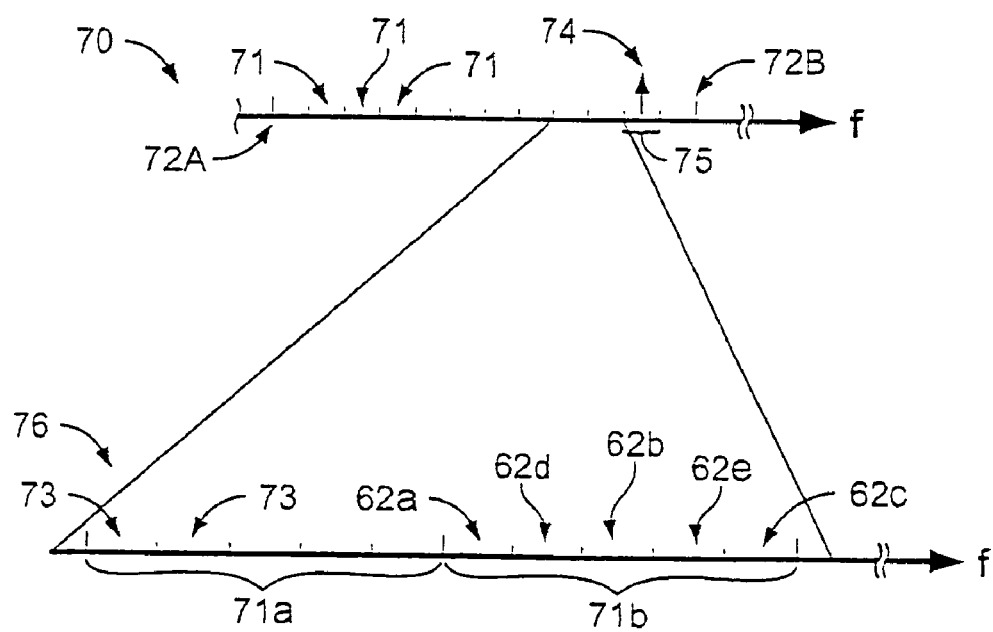
FIG. 7. illustrates the manner by which frequency bins are allocated by the adaptive antenna array architecture in the frequency domain according to one embodiment of the present invention.

FIG. 7 illustrates a frequency band distribution according to an embodiment of the present invention. The frequency band 70 of the OFDMA system, expressed in the frequency domain as shown, includes the range of frequencies between the bottom or low frequency cut-off 72a and the top or high frequency cut-off 72b. In an OFDMA system, the frequency band 70 is segmented into bins 73 for allocation to individual users which are then grouped into neighborhoods 71a and 71b (e.g., three to five bins per neighborhood) which are shown as an outtake 76 of the frequency band 70. However, the use of neighborhoods in the present embodiment is done for the sake of computational convenience. Although the preferred embodiment above was implemented using groupings of frequency bins called neighborhoods, many aspects of the preferred embodiment can be implemented without grouping the frequency bins in this way. In this case, the above preferred embodiment may operate in a different fashion, such as on a bin-by-bin basis, to accomplish the invention.

Once the bins 73 and neighborhoods 71a and 71b have been established, the BS 7 allocates bins to a particular user so as to maximize the overall system performance. An noted above, two significant constraints on performance are Inter-Bin Interference (IBI) and Co-Channel Interference (CCI). In an effort to minimize IBI and CCI, the BS 7 continually monitors a number of parameters and uses them to compute the bin allocations for a given user. Bin allocations are typically made at start-up, but can also be changed dynamically throughout operation in response to changes in the prevalent noise, interference, or fading conditions.

Figure 8:
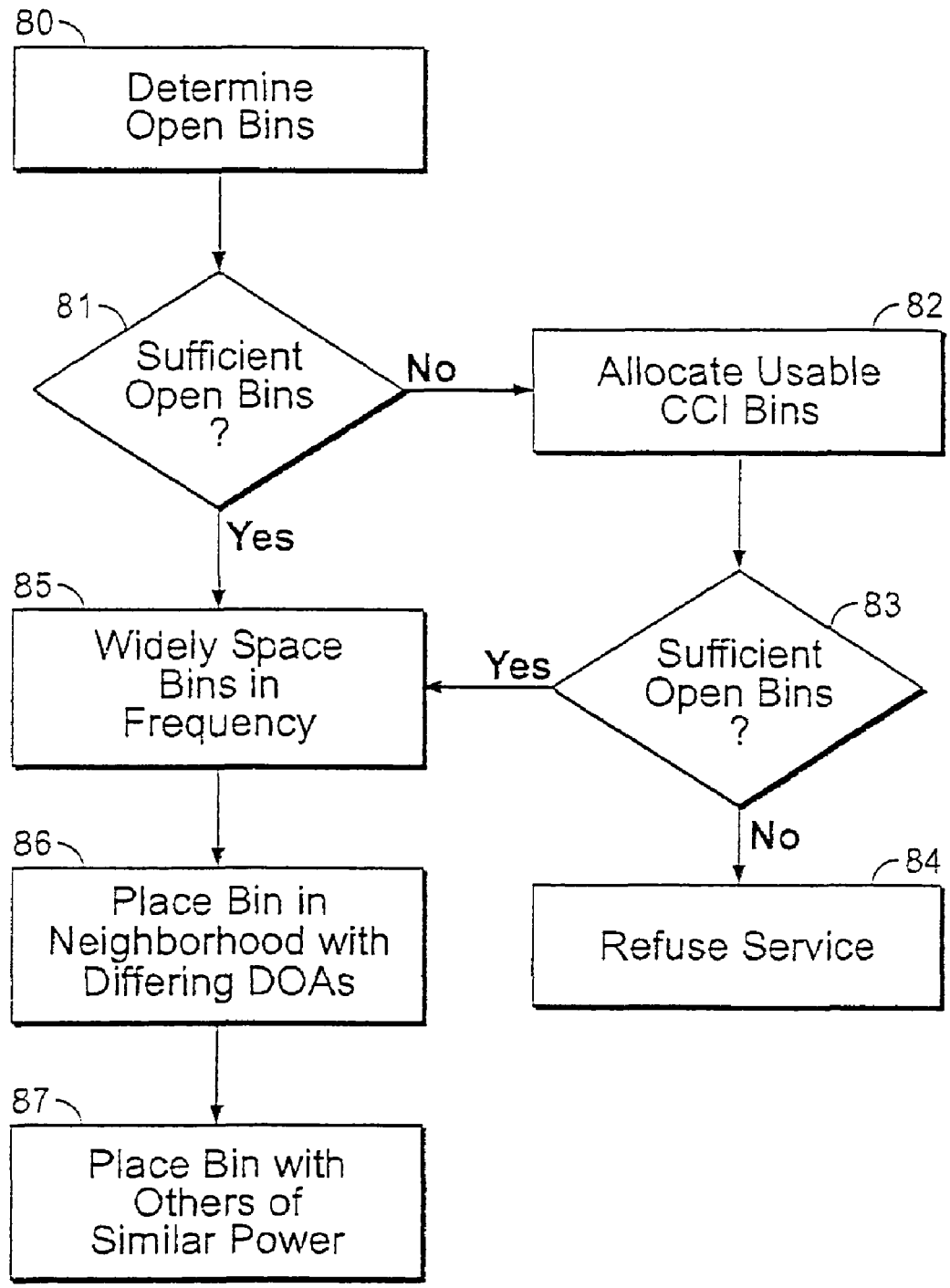
FIG. 8 is a block diagram of one exemplary method for frequency bin allocation of the preferred embodiment of the present invention.

FIG. 8 is a block diagram illustrating an exemplary method for allocating frequency bins by the BS 7 according to one embodiment of the present invention. To illustrate the bin selection method of the BS 7, it is assumed that the mobile users of FIGS. 6 and 7 are to be allocated K bins each. Using these inputs, the BS 7 allocates bins to satisfy the following (desired) criteria.

First, the BS 7 determines which bins are available to be allocated at step 80. Bins are not available to be allocated if the bin is in use by another user or the level of CCI is to high to provide adequate user signal resolution. For instance, in FIG. 7, the presence of CCI is indicated by frequency artifact 74. The bins thus dominated by CCI will not be available to be allocated at this stage. The BS 7 then determines if enough open bins exist to support a remote user seeking registration with the system or seeking to use more frequency bins (step 81). If the BS 7 can not allocate enough bins, the BS 7 analyzes (step 82) the previously rejected high-CCI bins 75. If the difference in the DOA's of the particular user and the co-channel interferers are sufficiently large to permit data to be carried in the bin 75, the BS 7 allocates the bin 75 to the user 82. Referring to FIG. 6, if the frequency artifact 74 is the output of CCI 61, the bins 75 dominated by frequency artifact 74 may be allocated to users 62a, 62b, 62c, or 62d because the DOA of these users is widely different from CCI 61 (FIG. 6). However, such CCI bins 75 could not be allocated to user 62e because the DOA of user 62e and CCI 61 are substantially similar. After determining what additional CCI bins 75, if any, may be allocated to the given user, the BS 7 then determines if sufficient bins now exist after the CCI-bin 75 allocation to support the user 83. If sufficient bins still do not exist, service is refused at step 84.

If sufficient bins exist to support the user, control passes to step 85 where the K bins belonging to any one user are spaced as far apart in frequency as possible to minimize mutual IBI. Thus, if many bins in the system are open, the bins used to carry data may be separated by several bins to reduce IBI.

Next at step 86, each bin is placed by the BS 7 in a neighborhood with bins belonging to other users which are spaced as far apart as possible in the dominant DOAs of their signals. Stated another way, the BS 7 collects unique sets of bins 71a and 71b as neighborhoods such that each frequency bin in a given neighborhood is assigned to remote users having substantially different DOAs. For example, a 3-5 bin neighborhood may be used. For example, FIG. 7 illustrates two 5-bin neighborhoods 71a and 71b. Applying the user DOAs from FIG. 6 and assuming for a moment a system in which only two neighborhoods exist and assuming all signals are of similar received power levels, ideally, the signals from user 62c may be placed in bins distant from the signals from user 62b because of the similarity in their DOAs. An ideal bin placement under this constraint would maximize the differences between the DOAs of successive bins for an overall neighborhood as shown in neighborhood 71b. The signal from user 62e is places in the bin between the signals from users 62b and 62c and the signals from users 62a and 62d are placed in successive bins as shown. This method of bin placement serves to reduce overall IBI. Spacing the bins belonging to each user over a wide range of frequencies within the band also provides frequency diversity. Frequency diversity is desirable because it serves to lessen the effects of fading over a certain frequency range. For example, by allocating many widely spaced frequency bins to a single user, if the operating environment is such that some of the bins experience fading, the overall signal quality will still remain high because the other user bins will not experience this fading; in short, fading over a small frequency range within the band will not effect the whole signal.

Next, at step 87, the BS 7 reevaluates the bin allocations. The BS 7 determines whether to place each bin in a neighborhood with bins belonging to other users such that differences in received signal power level of active bins in the neighborhood are minimized. By re-assigning bins according to signal power, the BS 7 ensures that weaker more distant signals are not overpowered by closer more powerful signals. Thus, turning to FIG. 6 for reference, the closer, stronger signals of users 62e and 62c may be grouped together, in a first group, while the more distant, weaker signals of users 62a, 62b, and 62d may be placed in a second group spaced from the first in frequency band 70.

The above method leads to better separation of potentially interfering signals in the spatial domain, thus facilitating the operation of spatial interference suppression. Optionally, the above criteria of steps 81-87 may be "weighted" differently, or considered in different orders to construct methods optimized for a specific (or category of) channel and interference scenarios, as will be apparent to those skilled in the art. In the example of FIG. 8, because IBI is a dominant impairment, spacing bins in frequency and placing bins in a neighborhood with bins of differing DOAs is given the most importance. Depending on the environment, other criteria may become dominant. For instance, the bins in a neighborhood may be placed with bins of similar power if the system is operated in an environment with a wide range of received signal power levels.

Since the number of bins in an OFDM system can be quite large (several hundred bins), the implementation of the overall method may be reasonably simple to enable execution in real-time. For instance, one possible way to implement it would be to construct a data structure which contains a table of information about each bin. The table may include information such as whether the bin is active or inactive (at any given time), the user occupying the bin if any, whether it is a data, control or pilot bin, modulation scheme and constellation size of sub-symbols in the bin, received power level, dominant DOA's of the user occupying the bin, power level and DOA's of any CCIs spectrally overlapping with the bin etc. Optionally, all items of the above information may not be available for each bin at all times. Certain items in the above table like received power levels appear to be best suited for update on a periodic (scheduled) basis (such as every n miliseconds or during each frame as per some existing framing structure). Other items are better suited for update in an event driven mode (such as user activity and constellation size), e.g., when a user arrives, departs, requests (or is forced to have) a change in the amount of allocated bandwidth.

Thus, through the use of the above factors, individual bins may be dynamically allocated and re-allocated on-the-fly. The composition of neighborhoods may also be changed dynamically if a trigger event, such as the advent of a new CCI source should arise. The number of bins assigned to a neighborhood may also change.

Although the preferred embodiment above was implemented using groupings of frequency bins called neighborhoods, many aspects of the preferred embodiment can be implemented without grouping the frequency bins in this way. In this case, the above preferred embodiment may operate in a different fashion, such as on a bin-by-bin basis, to accomplish the above invention. For instance, if frequency bins are not grouped into neighborhoods, allocating on a bin-by-bin fashion such that the DOAs of adjacent or approximately adjacent bins differ would accomplish the above invention. In this fashion, the above invention may also be implemented with neighborhoods containing only one bin.

Although the present invention has been described with reference to specific embodiments, those of skill in the art will recognize that changes may be made thereto without departing from the scope and spirit of the invention as set forth in the appended claims.

The invention claimed is:

1. An antenna array comprising:
multiple receiving elements configured to receive communications signals over a carrier frequency from a plurality of remote units, at least two receiving elements configured to receive the communication signals on a same frequency band during any period of time, the receiving elements being partitioned into a plurality of groups disposed remotely from one another by at least a predetermined minimum group spacing sufficient to obtain spatial diversity, each group containing at least one receiving element, at least one group including multiple receiving elements located proximal to one another and no farther apart than a predetermined maximum receiving element spacing to facilitate spatial filtering.

2. The antenna array of claim 1, wherein the predetermined maximum receiving element spacing is no more than one-half times a wavelength corresponding to the carrier frequency.

3. The antenna array of claim 1, wherein the predetermined minimum group spacing is at least five times a wavelength corresponding to the carrier frequency.

4. The antenna array of claim 1, wherein the multiple receiving elements constitute an adaptive antenna array and each group constitutes a sub-array.

5. The antenna array of claim 1, further comprising a controller configured to steer the multiple receiving elements electronically.

6. The antenna array of claim 1, wherein the multiple receiving elements constitute a switched beam antenna array.

7. A multi-point communications network comprising:
a transmitter and an antenna array receiver disposed at a primary site;
a plurality of remote units disposed at respective secondary sites for communication with the transmitter and antenna array receiver at the primary site;
the antenna array receiver at the primary site including multiple receiving elements configured to receive communications signals over a carrier frequency from the plurality of remote units, at least two receiving elements of the multiple receiving elements configured to receive the communication signals on a same frequency band during any period of time, the receiving elements being partitioned into a plurality of groups disposed remotely from one another by at least a predetermined minimum group spacing sufficient to obtain spatial diversity, each group containing at least one receiving element, at least one group including multiple receiving elements located proximal to one another and no farther apart than a predetermined maximum receiving element spacing to facilitate spatial filtering.

8. The network of claim 7, wherein the predetermined maximum receiving element spacing is no more than one-half times a wavelength corresponding to the carrier frequency.

9. The network of claim 7, wherein the predetermined minimum group spacing is at least five times a wavelength corresponding to the carrier frequency.

10. The network of claim 7, wherein the multiple receiving elements constitute an adaptive antenna array and each group constitutes a sub-array.

11. The network of claim 7, wherein the antenna further comprises a controller configured to steer the multiple receiving elements electronically.

12. The network of claim 7, wherein the multiple receiving elements constitute a switched beam antenna array.

13. An adaptive antenna array architecture for communication, the adaptive antenna array architecture comprising:
a plurality of adaptive antenna arrays for signal reception, the plurality of adaptive antenna arrays including a plurality of sub-arrays, each sub-array including at least two receiving elements, the receiving elements in the sub-arrays being located no farther apart than a predetermined maximum receiving element spacing to facilitate spatial filtering, wherein the sub-arrays being spaced to obtain spatial diversity;
an array fixation structure configured to position the plurality of adaptive antenna arrays;
an array support structure for positioning the array fixation structure at a desired elevation; and
a base station configured to control the adaptive antenna array architecture.

14. A signal receiver for receiving communications signals, the signal receiver comprising:
- an adaptive array configured to receive signals from remote units;
- a plurality of demodulator units configured to process the signal received;
- a plurality of beamformers configured to construct a desired signal response pattern as a function of direction of arrival data of the signals received, the desired signal response pattern having an angular radius indicative of relative gain of the desired signal in a given angular direction;
- a base station configured to modify the desired response pattern to provide a higher relative gain of the desired signal in one or more angular directions and minimize co-channel interference in other angular directions; and
- a spatial diversity combiner configured to remove interference from the received signals.

15. The receiver of claim 14, further comprising a direction of arrival processor configured to calculate a direction of arrival for the received signals.

16. The receiver of claim 14, further comprising an orthogonal frequency division multiple access unit configured to segment available bandwidth into a plurality of frequency bins for allocation.

17. A method for reducing signal interference in a communications system, the method comprising:
- assigning, by a processor, one or more frequency bins to a user, the assigned frequency bins being widely spaced frequency bins in a neighborhood of bins belonging to other users;
- spacing the one or more assigned frequency bins at one or more sufficiently different frequencies in a dominant direction of arrival of signals in each bin as a function of minimizing signal strength of active bins in the neighborhood of bins belonging to other users to reduce inter-bin interference; and
- placing the one or more assigned frequency bins relative to bins belonging to other users such that directions of arrival for the users are distinctly separable.

18. The method of claim 17 wherein the processor is a base station.

19. A method for allocating communication bandwidth in a communications system, the method comprising:
- determining, by a processor, a first direction of arrival of a signal for a first remote user and a second direction of arrival of the signal for a second remote user;
- assigning the first remote user to a first frequency bin; and
- assigning the second remote user to a second frequency bin based at least in part on the first and second direction of arrival of the signals such that the directions of arrival of the signals for adjacent frequency bins differ.

20. The method of claim 19 wherein the processor is a base station.

21. A method for avoiding interference in communications signals in a communications system, the method comprising:
- partitioning, by a processor, available bandwidth into a plurality of frequency blocks, the frequency blocks including a plurality of bins; and
- assigning a user to one or more bins in each of the frequency blocks, the one or more bins belonging to the user being widely spaced bins covering a wide range of frequencies, each bin being in a neighborhood of bins belonging to other users and placed in the neighborhood of bins such that differences in a power of active bins in the neighborhood are minimized.

22. The method of claim 21 wherein the processor is a base station.

* * * * *

UNITED STATES PATENT AND TRADEMARK OFFICE
CERTIFICATE OF CORRECTION

| | | |
|---|---|---|
| PATENT NO. | : 8,050,288 B2 | Page 1 of 1 |
| APPLICATION NO. | : 09/975518 | |
| DATED | : November 1, 2011 | |
| INVENTOR(S) | : Samir Kapoor and Daniel J. Marchok | |

It is certified that error appears in the above-identified patent and that said Letters Patent is hereby corrected as shown below:

On the Patent Cover after field (65), insert:

-- (63) Related U.S. Application Data
    Continuation of application no. 09/106,884, filed on June 30, 1998, now Pat. No. 6,795,424 --.

Signed and Sealed this

Eleventh Day of September, 2012

David J. Kappos
*Director of the United States Patent and Trademark Office*